United States Patent [19]

Angenieux

[11] Patent Number: 4,726,669
[45] Date of Patent: Feb. 23, 1988

[54] HIGH RELATIVE APERTURE OBJECTIVE LENS SYSTEM WITH COMPOUND FOCUSING

[76] Inventor: Pierre Angenieux, 87 Chemin des Hauts Crêts, CH-1223 Cologny, Geneva, Switzerland

[21] Appl. No.: 803,976

[22] Filed: Dec. 3, 1985

[51] Int. Cl.⁴ .............................. G02B 9/60
[52] U.S. Cl. ..................... 350/467; 350/450; 350/454; 350/455
[58] Field of Search ............... 350/472, 476, 468, 465, 350/464, 463, 456, 455, 454

[56] References Cited

U.S. PATENT DOCUMENTS

| 4,260,223 | 5/1987 | Hamanishi | 350/467 |
| 4,527,868 | 5/1987 | Mihara | 350/454 |

FOREIGN PATENT DOCUMENTS 5746223  5/1987  Japan .................... 350/456

Primary Examiner—John K. Corbin
Assistant Examiner—Yong K. Choi
Attorney, Agent, or Firm—Oblon, Fisher, Spivak, McClelland & Maier

[57] ABSTRACT

A high relative aperture objective lens system with a compound focusing system, comprising four lens components of varying respective distances, in which the first component is of positive refractive power, the second component is of positive refractive power, the third component is of negative refractive power, and the fourth component is of positive refractive power. The lens system is designed so that focusing is produced by translating the second and fourth components, the aberrations—and notably coma—being well corrected throughout the whole focusing distance range.

8 Claims, 8 Drawing Figures

DIAPHRAGM

HIGH RELATIVE APERTURE OBJECTIVE LENS SYSTEM WITH COMPOUND FOCUSING

FIELD OF THE INVENTION

The present invention concerns a telephoto objective lens system of high relative aperture in which focusing is obtained by the simultaneous axial translation of two of its components.

BACKGROUND OF THE INVENTION

Photographic lenses are generally designed for the best aberrational correction at an infinite focusing distance, so that when focusing is made upon finite distances—by the global translation of the whole lens system—aberrational correction is degraded, especially in the case where the lens is of high relative aperture.

It has been suggested to combime a global translation of the whole lens system with an internal relative translation of one of its components in order to balance aberrational correction, or to translate only several components.

SUMMARY OF THE INVENTION

The present invention concerns a new device allowing improvement of the aberrational correction—and particularly coma—throughout the whole focusing distance range. The lens system according to the new device comprises four lens components, axially arranged from the front to the rear of the lens system, hereinafter referred to as the "first lens component", the "second lens component", the "third lens component", and the "fourth lens component".

The front first lens component is of positive refractive power;

the second lens component is of positive refractive power;

the third lens component is of negative refractive power;

and the rear fourth lens component is of positive refractive power.

The second component has a convex front surface and a concave rear surface.

The third lens component is made of two parts separated by an air gap:

A front part, the rear surface of which is concave, and in which is concentrated most of the negative refractive power of the third lens component;

and the rear part, the front surface of which is concave and the rear surface of which is convex, the positive or negative refractive power of the rear part of the third lens component being very small—and even possibly nil.

The presence of the rear part of the third lens component is mainly justified by aberrational correction.

The lens system is designed so that focusing is obtained by the simultaneous axial translation of its second and fourth lens component, the aberrations—and notably coma—being well corrected throughout the whole focusing distance range.

The axial translation of the second and fourth lens components is forward when the focusing distance varies from infinity to a finite distance.

These two compound translations have different amplitudes, the displacement of the second lens component being less than that of the fourth lens component.

These two compound translations can be linked, for the simplicity of the construction, by a linear law, but this condition is clearly not limitative: the law guiding the respective translations of these two mobile components can be, if necessary, established in order to obtain best results, as far as aberrational correction is concerned, throughout the whole focusing distance range.

The preferred position of the diaphragm is inside the third lens component, or between the third and fourth lens components. But it can also be in any other location to best fulfill the needs concerning the field-of-view and the tailoring of vignetting, as any person of the craft will easily understand.

BRIEF DESCRIPTION OF THE DRAWINGS

The drawings correspond to two examples.

In the first example the diaphragm is located inside the third lens component; In the second example the diaphragm is located between the third and the fourth lens component.

DETAILED DESCRIPTION OF THE PREFERRED EMBODIMENTS

Figure 1A:
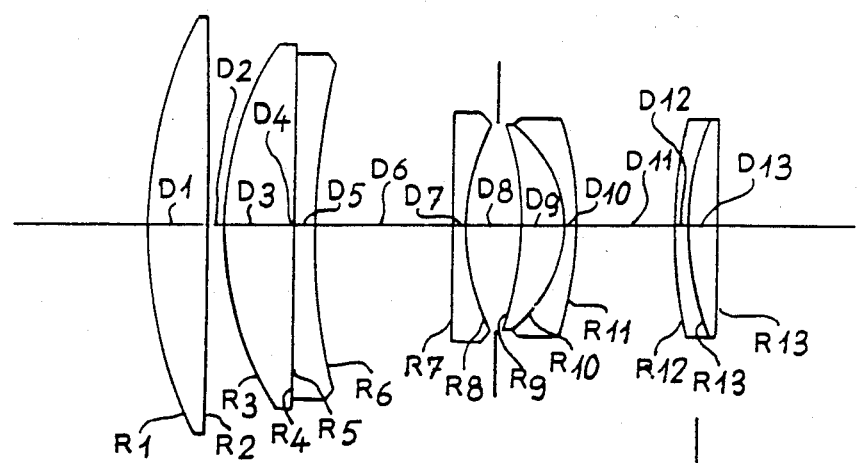
FIG. 1a is a longitudinal section view of the first example for an infinite focusing distance.
Figure 1B:
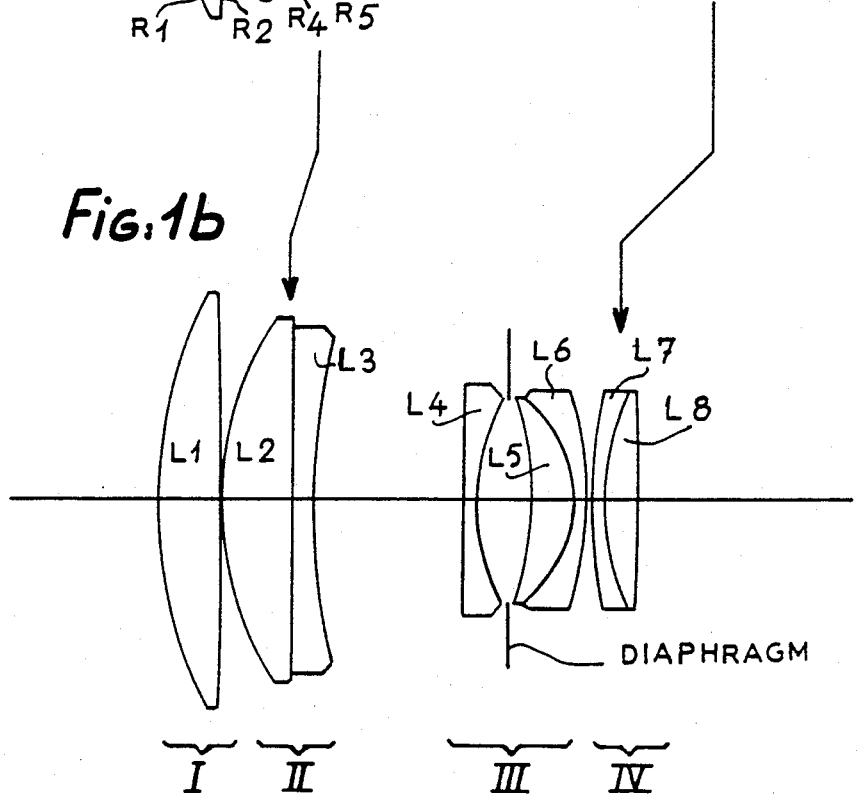
FIG. 1b is a longitudinal section view of the first example for a focusing distance corresponding to an image magnification of $-0.12$.
Figure 2A:
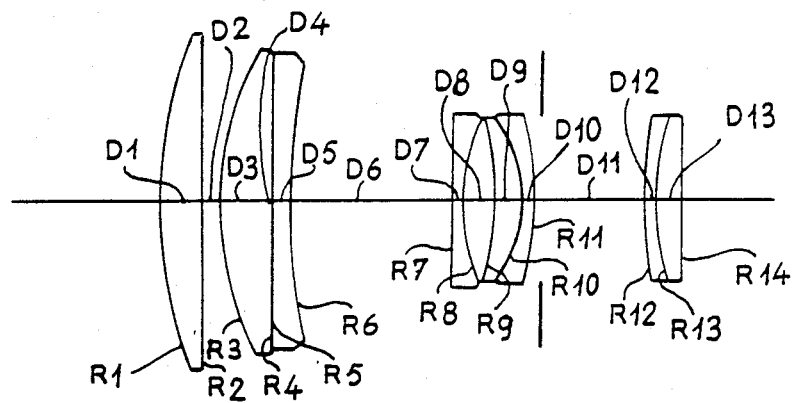
FIG. 2a is a longitudinal section view of the second example for an infinite focusing distance.
Figure 2B:
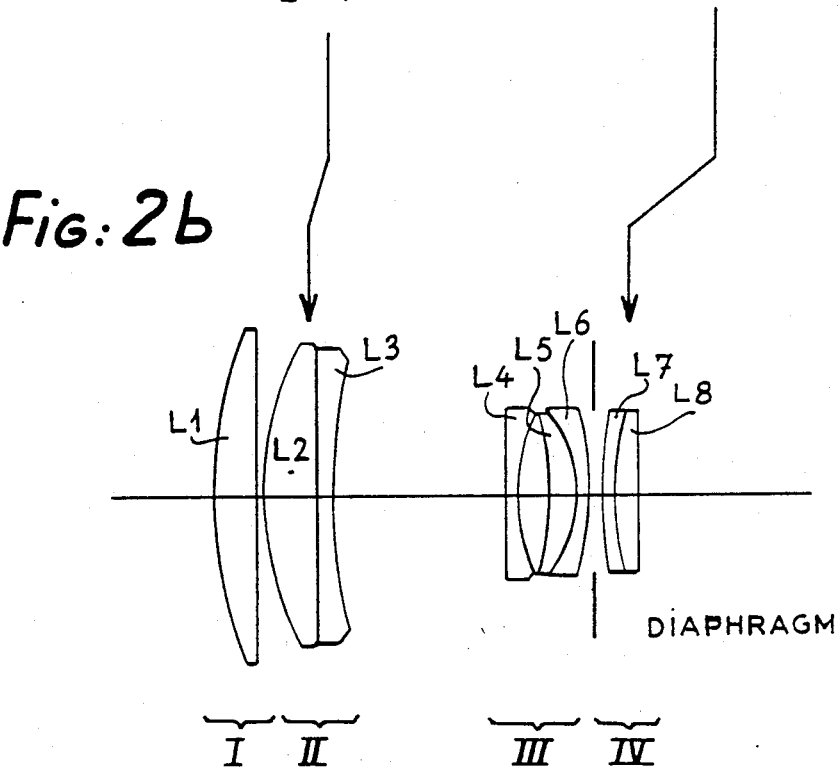
FIG. 2b is a longitudinal section view of the second example for a focusing distance corresponding to an image magnification of $-0.12$.
Figure 3A:
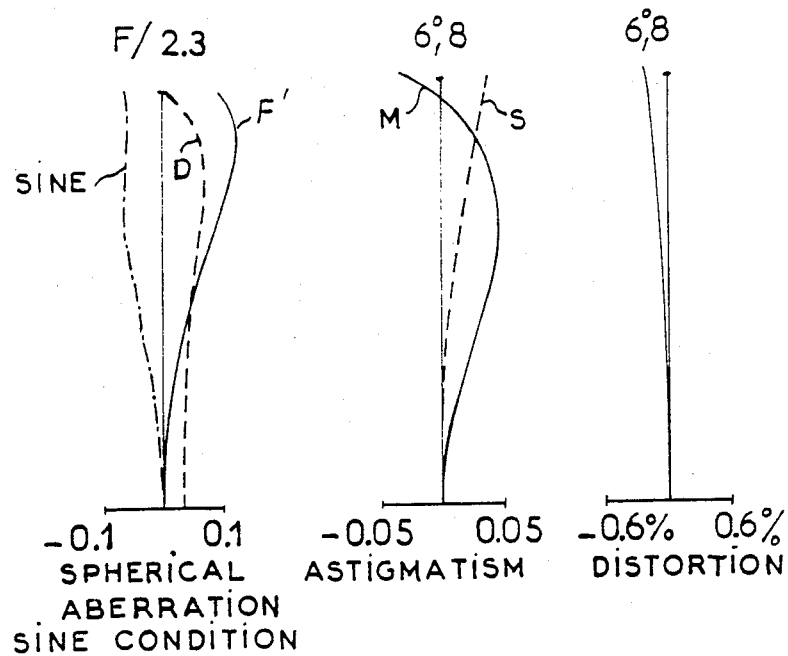
FIG. 3a is a graphic representation of the various aberrations of the first example for an infinite focusing distance.
Figure 3B:
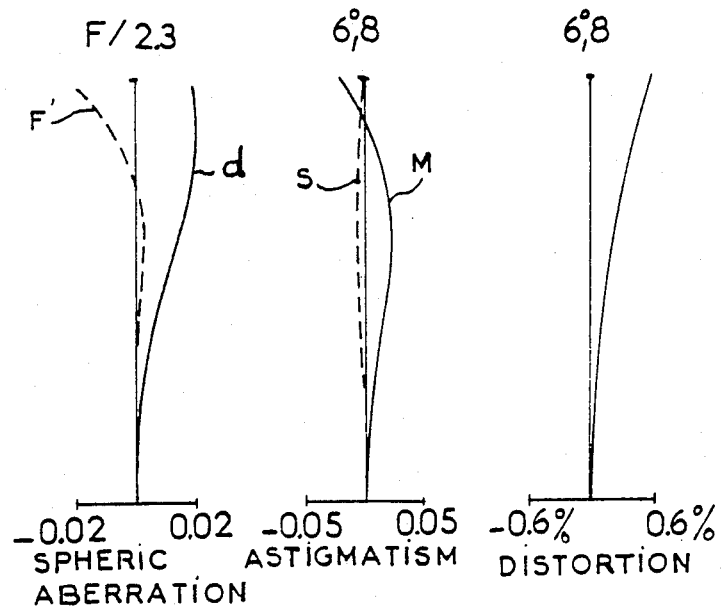
FIG. 3b is a graphic representation of the various aberrations of the first example for a focusing distance corresponding to an image magnification of $-0.12$.
Figure 4A:
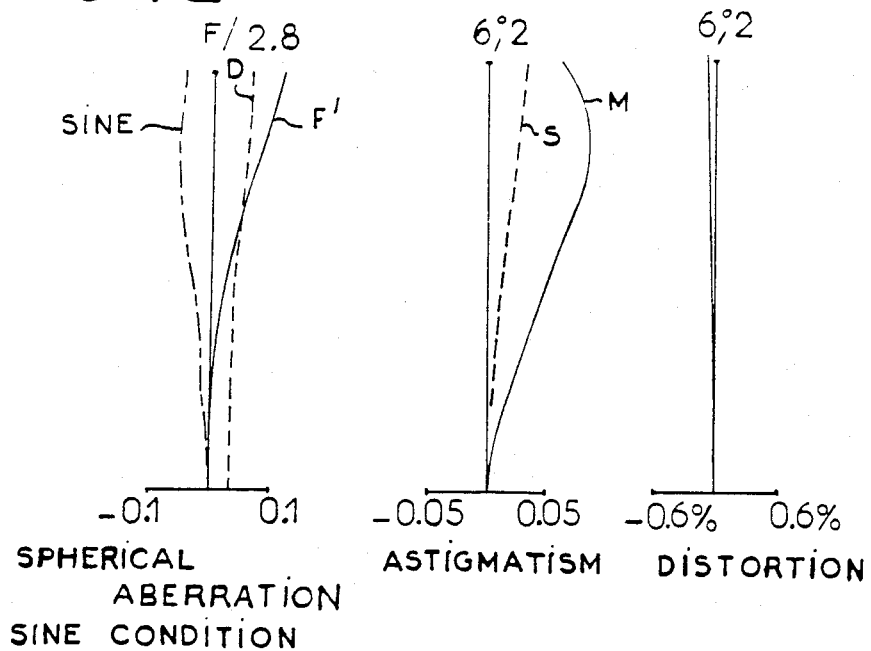
FIG. 4a is a graphic representation of the various aberrations of the second example for an infinite focusing distance.
Figure 4B:
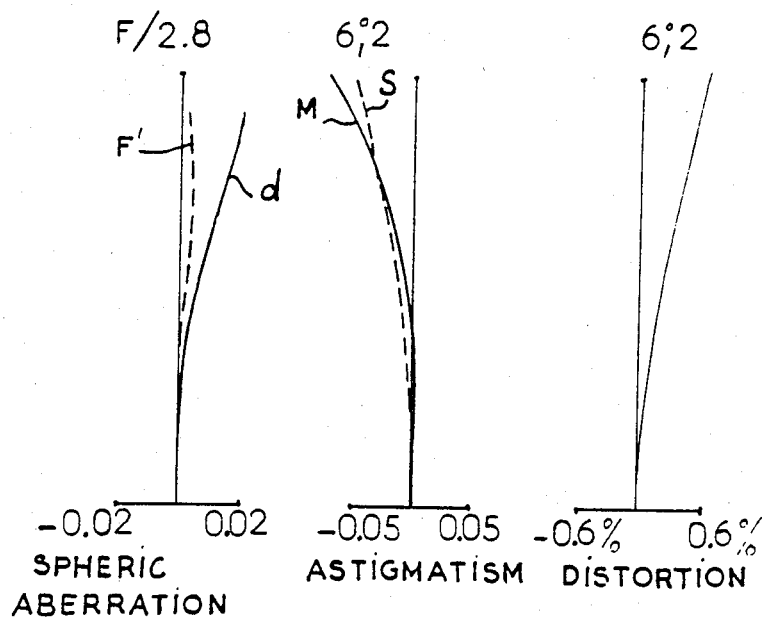
FIG. 4b is a graphic representation of the various aberrations of the second example for a focusing distance corresponding to an image magnification of $-0.12$.

On FIG. 1 and FIG. 2 are represented two lens systems in which we find, from the front to the rear:

The first lens component, denoted I, made of a single lens element L1 of positive refractive power;

the second lens component, denoted II, made of two lens elements:

a lens element L2, the positive refractive power of which is mainly due to the high curvature of its convex front surface;

and a lens element L3, the negative refractive power of which is mainly due to its concave rear surface.

In Example 1, L2 and L3 are separated by a small air gap and in Example 2, L2 and L3 are cemented in a doublet.

The third lens component, denoted III, made of two parts:

a front part made of a single lens element L4, the negative refractive power of which is mainly due to the curvature of its rear concave surface;

and the rear part made of the two lens elements L5 and L6 cemented in a doublet, with a concave front surface and a concave front surface and a convex rear surface.

And the fourth lens component, denoted IV, made of the two lens elements L7 and L8 cemented in a doublet.

Next we give the numericl data relevant to our two examples, where Ri is the radius of curvature of the i-th surface, counting from the front, Di the lens thickness or the air separation, Ni the refractive index and Vi the Abbe number.

Example 1

| F = 100 | Aperture 1:2.3 | Field = +/− 6I8 | |
|---|---|---|---|
| R1 = 47.604 | D1 = 6.66 | N1 = 1.589 | V1 = 6.12 |
| R2 = −1112.252 | D2 = 1.67* | | |
| R3 = 34.355 | D3 = 7.77 | N3 = 1.497 | V3 = 81.6 |
| R4 = 3149.161 | D4 = 0.06 | | |
| R5 = ∞ | D5 = 2.22 | N5 = 1.785 | V5 = 25.9 |
| R6 = 72.824 | D6 = 14.99* | | |
| R7 = 991.259 | D7 = 1.39 | N7 = 1.772 | V7 = 49.7 |
| R8 = 22.317 | D8 = 6.11 | | |
| R9 = −31.786 | D9 = 4.44 | N9 = 1.806 | V9 = 40.9 |
| R10 = −13.670 | D10 = 1.39 | N10 = 1.772 | V10 = 49.7 |
| R11 = −36.997 | D11 = 9.99* | | |
| R12 = 52.449 | D12 = 1.39 | N12 = 1.728 | V12 = 28.4 |
| R13 = 28.378 | D13 = 3.33 | N13 = 1.772 | V13 = 49.7 |
| R14 = −376.983 | | | |
| Back-focus = 44.79 | ΣD = 61.41 | | |
| *For ν = −0.12 | | | |
| f1 = 77.37 | D2 = 0.24 | | |
| f2 = 221.95 | D6 = 16.41 | | |
| f3 = −31.60 | D11 = 0.32 | | |

Example 2

| F = 100 | Aperture = 1:2.8 | Field = +/− 6I2 | |
|---|---|---|---|
| R1 = 47.390 | D1 = 4.74 | N1 = 1.589 | V1 = 61.2 |
| R2 = −1223.349 | D2* = 1.75 | | |
| R3 = 33.356 | D3 = 5.73 | N3 = 1.497 | V3 = 81.6 |
| R4 = 542.893 | D4 = 0.05 | | |
| R5 = 695.591 | D5 = 1.99 | N5 = 1.785 | V5 = 25.9 |
| R6 = 69.594 | D6* = 17.51 | | |
| R7 = 333.114 | D7 = 1.25 | N7 = 1.772 | V7 = 49.7 |
| R8 = 21.850 | D8 = 3.49 | | |
| R9 = −29.268 | D9 = 2.99 | N9 = 1.806 | V9 = 40.9 |
| R10 = −13.321 | D10 = 1.25 | N10 = 1.772 | V10 = 47.9 |
| R11 = −33.994 | D11* = 11.47 | | |
| R12 = 49.284 | D12 = 1.25 | N12 = 1.728 | V12 = 28.4 |
| R13 = 30.565 | D13 = 2.74 | N13 = 1.772 | V13 = 49.7 |
| R14 = −632.129 | | | |
| Back-focus = 39.78 | ΣD = 56.21 | | |
| = 55.54 | *for ν = −0.12 | | |
| f1 = 77.29 | D2 = 0.60 | | |
| f2 = 216.50 | D6 = 18.65 | | |
| f3 = −31.25 | D11 = 1.26 | | |

Focusing is obtained by the simultaneous axial translation of the second and fourth lens components, the fourth lens component carrying the bulk of magnification variations, whereas the mission of the second lens component is mostly to correct aberrations—and particularly coma—for close focusing distances.

It should be understood that the two given examples do not restrict the scope of the present invention. It is clear that the object of the present invention can equally be accomplished if the number of lens elements is increased, for example by breaking some lens elements into two single lens elements, and/or if the curvature of some refractive surfaces are significantly altered, within certain limits, as any person of the craft will understand.

To obtain best performances, the following conditions must be satisfied:

(1) $f3 < f1 < f2$ (2) $0.22 < f3/F < 0.44$ (3) $0.40 < \phi/F < 0.80$ (4) $0.25 < R_{II}/F < 0.50$ (5) $0.15 < R_{III}/F < 0.30$ (6) $P_{g,f} - \bar{P}_{g,f} > 0.02$ Where f1, f2 and f3 are the focal lengths of the first, second and third lens components respectively;

Where F is the focal length of the whole lens system;

Where $\phi$ represents the focal length of the combination of the first and second lens component when their relative position correspond to an infinite focusing distance;

Where $R_{II}$ represents the radius of curvature of the convex front surface of the second lens component;

Where $R_{III}$ represents the radius of curvature of the concave rear surface of the front part of the third lens component;

And where $P_{g,f}$ is the partial relative dispersion of the glass in which at least one lens element of the second lens component is made, given by the formula: $P_{g,f} = (n_g - n_F)/(n_F - n_C)$ in which $n_g$, $n_F$ and $n_C$ are the refractive indexes for the wave lengths of 436, 486 and 656 nanometers respectively, and where $\bar{P}_{g,f}$ is the Abbe line, given by the formula: $\bar{P}_{g,f} = 0.6438 - 0.001682\ Vd$, where Vd is the Abbe number.

Conditions (1) and (2) allow the best structure in the whole lens system by adequately distributing the refractive powers of the first, second and third lens components and yet permitting a correct balance of all aberrations.

Condition (3) is required for a compact lens system: the first and second lens components together constitute a front lens component of sufficient positive refractive power to give a telephoto lens system when combined with the third lens component and the rear fourth lens component.

Condition (4), which demands a high curvature for the front surface of the second lens component, permits, among other effects, the maintenance of coma correction when the second lens component is translated for focusing.

Condition (5), which demands a high curvature for the rear surface of the front part of the third lens component, serves the purpose of concentrating most of the negative refractive power of the third lens component in its front part, compensates for the influence of the first and second lens components upon various aberrations, and in particular ensures the obtaining of the best sine condition.

Condition (6) is required for the best correction of chromatism per reducing the secondary spectrum. This condition demands the use of at least one special glass know in the trade under the name of ED.

What is claimed is:

1. A high relative aperture objective lens system with compound focusing, comprising four lens components axially arranged, from the front to the rear of the lens system, so that the first lens component is of positive refractive power, the second lens component is of positive refractive power, the third lens component is of negative refractive power and the fourth lens component is of positive refractive power, the said second lens component having a convex front surface and a concave rear surface, the said third lens component being made of two parts separated by an air gap, the front part of the said third lens component being of negative refractive power and having a concave rear surface and the rear part of the said third lens component having a concave front surface and a convex rear surface, whereby the said objective lens system performs focusing by simultaneously translating forward the said second and fourth lens components only when the object moves from infinity to a finite distance, the translation of the said second lens component being of lesser amplitude than that of the said fourth lens component.

2. A high relative aperture objective lens system with compound focusing according to claim 1 and satisfying the following conditions:
   (1) $f3 < f1 < f2$
   (2) $0.22 < f3/F < 0.44$
where f1, f2 and f3 represent the focal lengths of the first, second and third lens component respectively and where F represents the focal length of the whole objective lens system.

3. A high relative aperture objective lens system with compound focusing according to claim 2 and satisfying the following condition:
   $0.40 < \phi/F < 0.80$ where $\phi$ represents the focal length of the combination of the first and second lens component when their relative position corresponds to the infinite focusing distance.

4. A high relative aperture objective lens system with compound focusing according to claim 2 and satisfying the following condition:
   $0.25 < R_{II}/F < 0.50$ where $R_{II}$ represents the radius of curvature of the front surface of the second lens component.

5. A high relative aperture objective lens system with compound focusing according to claim 2 and satisfying the following condition:
   $0.15 < R_{III}/F < 0.30$ where $R_{III}$ represents the radius of curvature of the rear surface of the front part of the third lens component.

6. A high relative aperture objective lens system with compound focusing according to claim 1 and where the second lens component comprises at least one lens element of positive refractive power made of a special glass satisfying the following condition:
   $P_{g,f} - \bar{P}_{g,f} > 0.02$ where $P_{g,f}$ is the partial relative dispersion of the said special glass, given by the formula: $P_{g,f} = (n_g - n_F)/(n_F - n_C)$ in which $n_g$, $n_F$ and $n_C$ are the refractive indexes for the wave lengths of 436, 486 and 656 nanometers respectively and where $\bar{P}_{g,f}$ is the Abbe line, given by the formula: $\bar{P}_{g,f} = 0.6438 - 0.001682 \, V_d$ in which $V_d$ is the Abbe number.

7. A high relative aperture objective lens system with compound focusing according to claim 1 and in which the diaphragm is located inside the air gap separating the front part and the rear part of the third lens component.

8. A high relative aperture objective lens system with compound focusing according to claim 1 and in which the diaphragm is located between the third and fourth lens component.

* * * * *